United States Patent [19]

Derrien et al.

[11] Patent Number: 5,263,664
[45] Date of Patent: Nov. 23, 1993

[54] RAISABLE LANDING GEAR

[75] Inventors: Michel Derrien, Versailles; Dominique Chauvet, Chatillon, both of France

[73] Assignee: Messier-Bugatti, Velizy Villacoublay, France

[21] Appl. No.: 19,896

[22] Filed: Feb. 19, 1993

[30] Foreign Application Priority Data

Mar. 3, 1992 [FR] France .............. 92 02520

[51] Int. Cl.⁵ .............................. B64C 25/10
[52] U.S. Cl. .............. 244/102 R; 244/102 A; 244/102 SL
[58] Field of Search ......... 244/102 R, 102 SS, 102 A, 244/102 SL

[56] References Cited

U.S. PATENT DOCUMENTS 2,454,611 11/1948 Paraskevas ............ 244/102 R
3,188,026 6/1965 Perdue et al. ........... 244/102 R

FOREIGN PATENT DOCUMENTS 0288377 4/1988 European Pat. Off. .
1239949 5/1967 Fed. Rep. of Germany .

Primary Examiner—Michael S. Huppert
Assistant Examiner—Anne E. Bidwell
Attorney, Agent, or Firm—Sixbey, Friedman, Leedom & Ferguson

[57] ABSTRACT

The invention relates to raisable landing gear having a shock absorber strut and a sliding rod. According to the invention, the landing gear includes a lateral stabilizer hinged to the strut and fitted with a wheel at its free end, together with mechanical coupling means associated with said lateral stabilizer, in such a manner that: firstly lowering the landing gear deploys the lateral stabilizer so that its wheel, when the landing gear is in its lowered position, provides support additional to that provided by the wheels of the wheel set, and also constitutes a lateral stabilizer proper during taxiing of the airplane; and secondly raising the landing gear folds the lateral stabilizer so as to enable the entire landing gear assembly to be housed when in the raised position. It then becomes possible to organize the landing gear beneath the fuselage of the airplane, thereby making it possible to obtain landing gear that is extremely short.

10 Claims, 4 Drawing Sheets

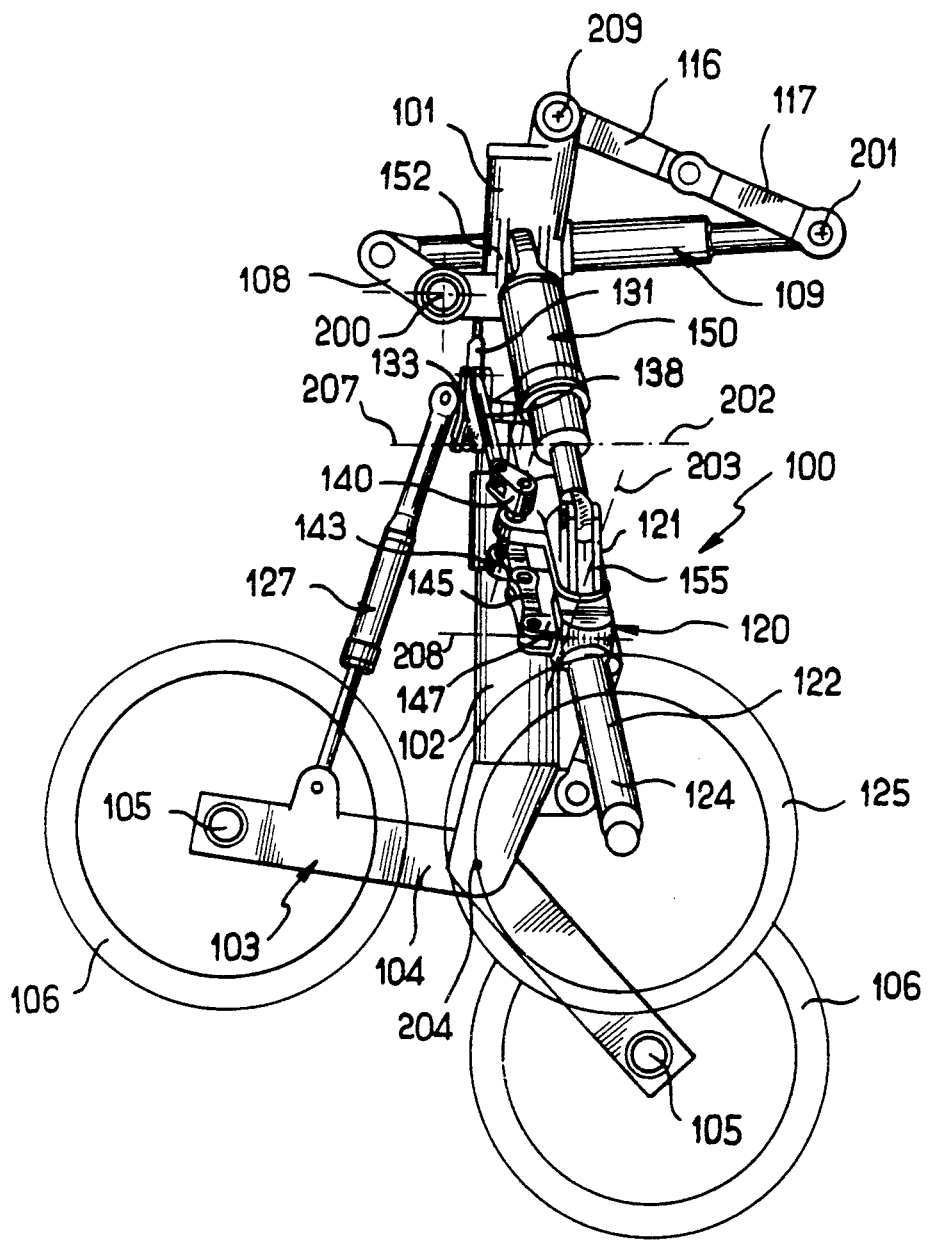
FIG_3

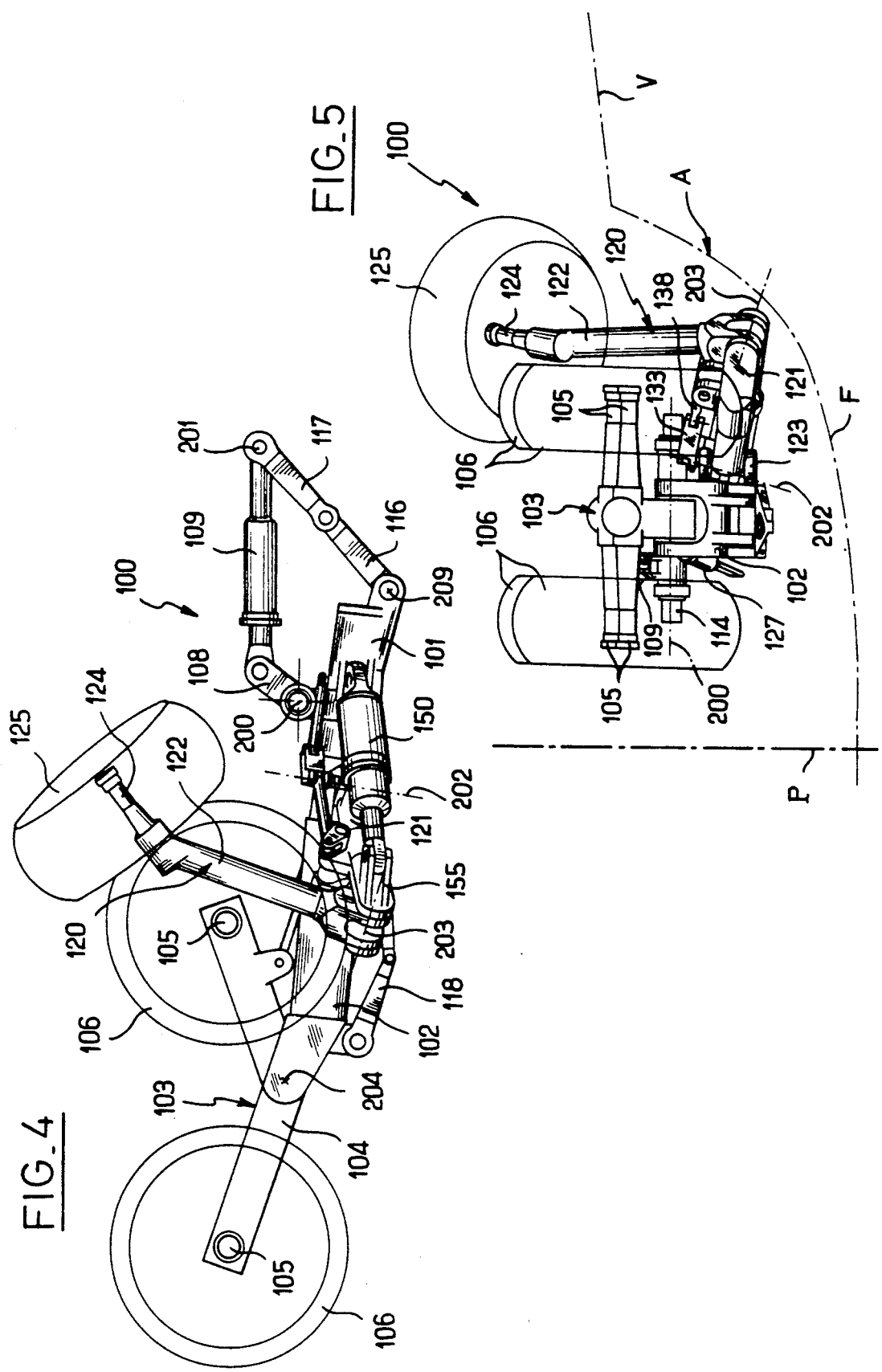

RAISABLE LANDING GEAR

The present invention relates to raisable aircraft landing gear, the landing gear being of the type having a direct shock absorber, i.e. including a shock absorber whose cylinder is hinged to the structure of an airplane and whose sliding rod carries a set of wheels.

BACKGROUND OF THE INVENTION

Raisable landing gear of this type, in which the set of wheels may be implemented in the form of a tilting bogie, extends essentially vertically (in the landing gear down position) so as to avoid any risk of the sliding rod jamming because of excessive shear forces being exerted on said sliding rod. The lateral positioning of such landing gear (also referred to as "main" landing gear) on either side of the longitudinal midplane of an airplane is generally selected to be in a determined region of each wing, at a distance from the longitudinal midplane that is sufficient to ensure that the airplane has sufficient lateral stability while taxiing, in particular while turning.

However, the further the wing landing gear is located from the longitudinal midplane of the airplane for the purpose of increasing lateral stability during taxiing, the greater the length of the landing gear (because of the dihedral angle of the wings), and this naturally has a direct effect on weight. Furthermore, the load per wheel is limited in order to allow for the strength of the runway. With large-capacity transports (mass greater than 250 tons), it is possible to provide main wing landing gear in the form of two four-wheel sets, together with a central landing gear set having two wheels (diabolo) which provides a better spread of load during taxiing and take-off.

Attempts are being made at present to reduce the weight of structures and equipments more and more in order to obtain maximum performance and greater range, and in particular in order to use landing gear that is as short as possible. However, persons skilled in the art know that wing landing gear must be placed at a adequate distance from the longitudinal midplane of an aircraft to ensure that lateral stability remains satisfactory while taxiing.

OBJECT AND SUMMARY OF THE INVENTION

A particular object of the invention is to solve the above problem by designing raisable landing gear that is as short as possible and that distributes a load during taxiing in a manner that makes it possible to omit the central landing gear, without affecting the lateral stability of an aircraft that is taxiing, even when turning tightly at the maximum authorized speed.

Another object of the invention is to provide raisable landing gear of a structure and organization that makes it possible to minimize the fastening points on an airplane, and also to obtain good control over the various movements of its components while said landing gear is being lowered or raised.

Another object of the invention is to provide raisable landing gear capable of being fitted with a wheel set implemented in the form of a tilting bogie.

More particularly, the present invention provides raisable landing gear comprising a shock absorber strut hinged to the structure of an airplane and provided with a shock absorber rod that is slidable in said strut and that has a wheel set provided at the end thereof, wherein the landing gear further includes a lateral stabilizer hinged to the strut, being capable of pivoting about a hinge axis that is essentially parallel to the longitudinal midplane of the airplane, and fitted with a wheel at its free end, and also mechanical coupling means associated with the lateral stabilizer in such a manner that: firstly lowering the landing gear deploys the lateral stabilizer so that the wheel of said stabilizer when in the landing gear lowered position provides support additional to that provided by the wheel set and also constitutes a lateral stabilizer proper while the airplane is taxiing; and secondly raising said landing gear folds the lateral stabilizer so as to enable the entire landing gear to be housed together in the landing gear raised position.

The lateral stabilizer thus makes it possible to solve simultaneously the problems of load distribution and of lateral stability while the airplane is running on a runway, while nevertheless making it possible to use landing gear that is very short, such that the landing gear can be disposed beneath the fuselage of the airplane, which constitutes the optimum disposition when it is desired that the landing gear should be as short as possible. With such a disposition, it is possible to avoid piercing the rear spars of the wings, while still keeping the central keel member of the fuselage intact.

Preferably, the lateral stabilizer is formed by two arms that are hinged together, comprising an upper arm which is hinged on a lateral appendix of the strut, and a lower arm that is terminated by a wheel axle, and the mechanical coupling means associated with said stabilizer include a hinged system organized in such a manner that raising the landing gear causes the lower arm to pivot through about 90° relative to the upper arm.

Thus, in addition to having landing gear that is short, it is possible to achieve great compactness in the raised position.

In a preferred embodiment, the hinged system comprises, in succession: a first link hinged via a ball joint to a fixed point of the airplane structure, a first crank lever hinged on a first appendix of the upper arm to pivot about a first axis parallel to the hinge axis between said upper arm and said strut, a second link, a second crank lever hinged on a second appendix of the upper arm to pivot about a second axis which is parallel to the hinge axis between the upper and lower arms, and a third link hinged on an appendix of the lower arm, said second link, said second crank lever, and said third link constituting an alignment for the two arms of the lateral stabilizer.

Such a system makes it possible to minimize the attachment points on the airplane, but without requiring significantly increased power for driving the landing gear in spite of the presence of the lateral stabilizer.

It is then advantageous for the first link and the first crank lever to be hinged to each other about an axis which is colinear with the hinge axis between the upper arm and the strut when the lateral Stabilizer is in its deployed position, thereby ensuring that said first link is neutral while the aircraft is taxiing.

Such an arrangement ensures that the first link has an effect only while the landing gear is being raised, and does not give rise to any interfering movement while the airplane is taxiing.

Also preferably, the third link is rotatably hinged on the appendix of the lower arm so as to rotate freely about a third axis also parallel to the hinge axis between the upper arm and the strut.

It is also advantageous for the landing gear further to include a shock absorber associated with the lateral stabilizer, the body of the shock absorber being hinged to the strut, and the rod of the shock absorber being hinged to the upper arm of said stabilizer.

It is then preferable for the rod of the shock absorber to be rotatably hinged on a third appendix of the upper arm to rotate freely about an axis that coincides with the hinge axis between the upper arm and the lower arm.

Also advantageously, the upper portion of the strut is extended beyond its hinge axis by an end appendix which is connected to the structure of the airplane via a short hinged side brace which side brace, when in alignment, constitutes means for bracing the landing gear in its lowered position and means for locking the landing gear in its raised position.

Such a side brace thus constitutes a significant improvement over known wing landing gear in which the side braces are necessarily long. In addition, the landing gear can be locked in its raised position without the catch box that is normally provided, thereby further simplifying the structure and contributing to reducing the weight of the airplane.

It is then preferable for the short side brace to be disposed to remain in a midplane of the strut that is perpendicular to the hinge axis of said strut.

This makes it possible to avoid setting up twisting forces in the strut, thereby reducing the stress to which it is subjected.

Finally, when the landing gear is of the kind in which the wheel set is implemented in the form of a tilting-chassis bogie, it is possible to provide for a telescopic link to be associated with the tilting bogie in such a manner as to ensure that said bogie is put into a horizontal position in the landing gear raised position, the body of said link being hinged via a ball joint to the structure of the airplane, and the rod of said link being hinged to the tilting chassis of said bogie.

All the advantages of tilting bogie landing gear are thus retained, in addition to the advantages inherent to having landing gear that is short.

BRIEF DESCRIPTION OF THE DRAWINGS

Other characteristics and advantages of the invention appear more clearly in the light of the following description and the accompanying drawings which relate to a particular embodiment, and in which:

FIG. 3 is a side view thereof, with both the views of FIGS. 2 and 3 showing the landing gear in its lowered position; and FIGS. 4 and 5 are respectively a side view and a front view of the above landing gear when in its raised position, with its stabilizer folded so that the entire assembly can be received in the fuselage of the airplane.

MORE DETAILED DESCRIPTION

Figure 1:
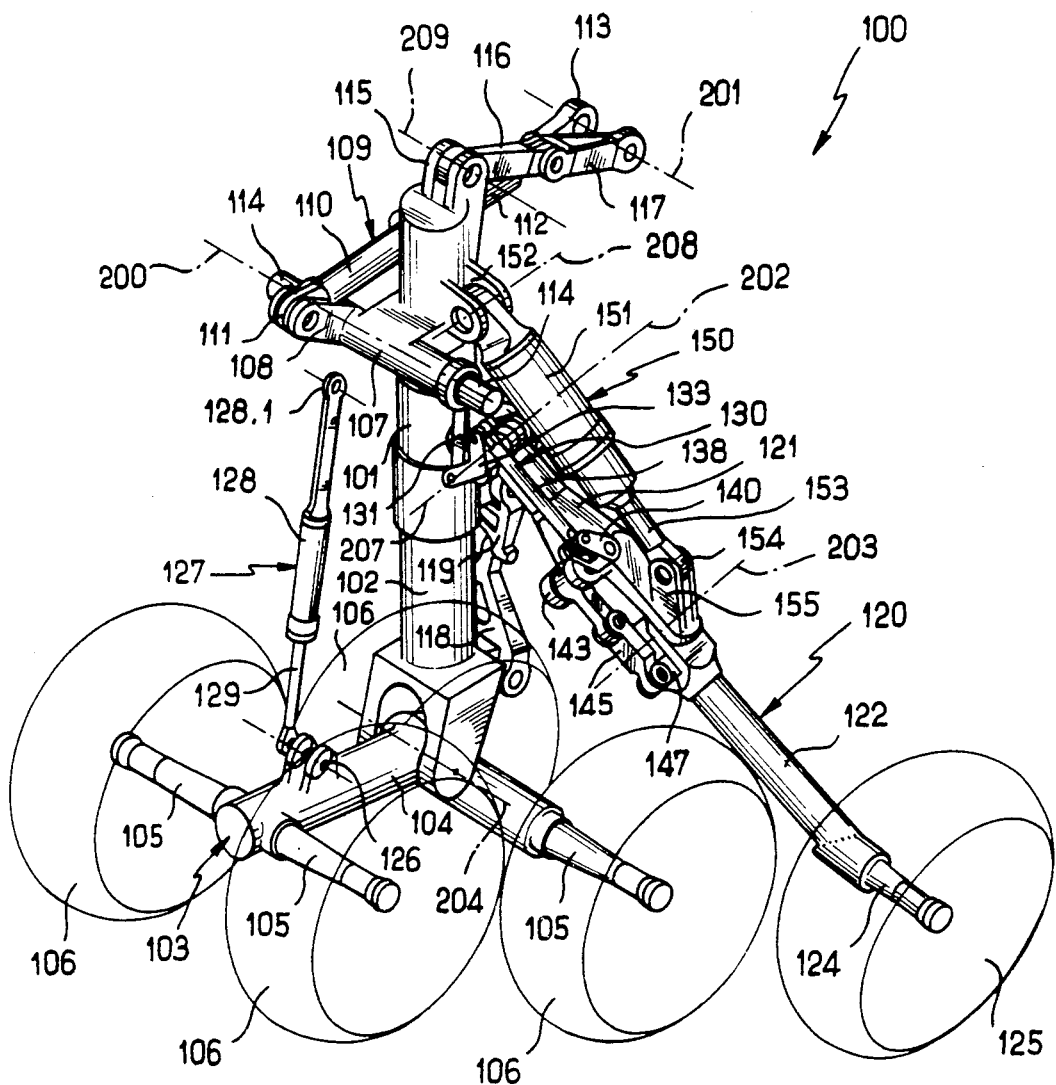
FIG. 1 is a perspective view showing raisable landing gear of the invention in the landing gear lowered position, with its side stabilizer deployed (the wheels being represented, in all of the figures, merely by outlines for reasons of clarity)

The various component parts of raisable landing gear of the invention are now described in greater detail with reference to FIGS. 1 to 3 which show such landing gear fitted with a lateral stabilizer, the landing gear being shown in its lowered position.

The raisable landing gear 100 is of the direct shock absorber type, that is to say it has a shock absorber constituted by a strut 101 and a sliding rod 102 with a set of wheels 103 provided at the end of the rod. In this case, the set of wheels 103 is implemented in the form of a bogie having a tilting chassis 104 and including stub axles 105 associated with two pairs of wheels 106. Reference 204 designates the hinge axis of the tilting chassis on a fork at the bottom end of the sliding rod 102. The shock absorber strut 101 has a transverse extension 107 whose two ends 114 define a hinge axis 200 relative to the structure of the airplane, said structure being represented in part in FIG. 2 and being given the reference S. The hinge axis 200 is essentially contained in a front plane perpendicular to the longitudinal midplane of the airplane. This longitudinal midplane is referenced P in FIG. 2 and the outline of the corresponding airplane A is sketched in chain-dotted lines, with a portion F constituting the fuselage and a portion V constituting the associated wing. In this case, the landing gear 100 is disposed beneath the fuselage F of the airplane, thereby making it possible to have landing gear that is extremely short, with such a disposition being made possible only by the presence of a lateral stabilizer which, for food-distribution purposes, is additional to the wheels in the wheel set of the landing gear, and which also provides the stabilization proper that is required while the airplane is taxiing. Nevertheless, in a variant, the raisable landing gear of the invention could be disposed beneath the wing, in the vicinity of the airplane fuselage, with the lateral stabilizer continuing to perform the two above-mentioned functions.

According to an essential aspect of the invention, the landing gear 100 includes a lateral stabilizer 120 hinged to the strut 101, being capable of pivoting about a hinge axis 202 that is essentially parallel to the longitudinal midplane of the airplane, said stabilizer being fitted with a wheel 125 at its free end. Coupling means 130 are also associated with the lateral stabilizer 120 so that lowering the landing gear causes the lateral stabilizer to be deployed in such a manner that when the wheel set 103 is in the lowered position, the wheel 125 of said stabilizer complements the wheels 106 of the wheel set and also constitutes a lateral stabilizer per se while the airplane is taxiing.

More precisely, the lateral stabilizer 120 is constituted in this case by two arms that are hinged to each other, comprising an upper arm 121 which is hinged to a lateral appendix 123 of the strut 101 (about above-mentioned hinge axis 202), and a lower arm 122 which is terminated by a wheel axle 124 on which an associated wheel 125 can be seen. In this case, the upper arm 121 is terminated by a fork-shaped end with the corresponding end of the lower arm 122 being received between the two prongs of the fork-shape. The hinge axis between the two arms 121 and 122 is referenced 203.

When the landing gear is in the lowered position, the stabilizer 120 is deployed in the above manner, extending laterally away from the far side of the landing gear relative to the longitudinal midplane of the airplane. When the airplane is running on the ground, the wheels 106 of the wheel set and the wheel 125 of the lateral stabilizer support the corresponding load, and, in addition, the lateral offset of the wheel 125 of said stabilizer also provides the lateral stability required while the airplane is taxiing, even while it is performing tight turns at the maximum authorized speed.

In practice, the lateral stabilizer is preferably formed by two hinged arms as shown, so as to enable said stabilizer to be folded up in the compact manner required for raisable landing gear.

FIGS. 4 and 5 show the same raisable landing gear 100 in its raised position, with its lateral stabilizer 120 folded, with this being done, as described below, by a disposition of the mechanical coupling means associated with said stabilizer, which means are organized in such a manner that raising the landing gear causes the lower arm 122 to pivot through about 90° relative to the upper arm 121. It may be observed in FIG. 5 that the entire raised landing gear is extremely compact, which is compatible with the entire landing gear being received in its raised position inside the fuselage of the airplane. Such a disposition makes it possible to avoid making holes in the rear wing spars and also to keep the central keel member of the fuselage (not shown) intact.

The mechanical coupling means associated with the lateral stabilizer 120 are essentially constituted by a hinged system 130 whose various members constituting an articulated chain going from the structure of the airplane to the bottom arm of the lateral stabilizer are described below.

Figure 2:
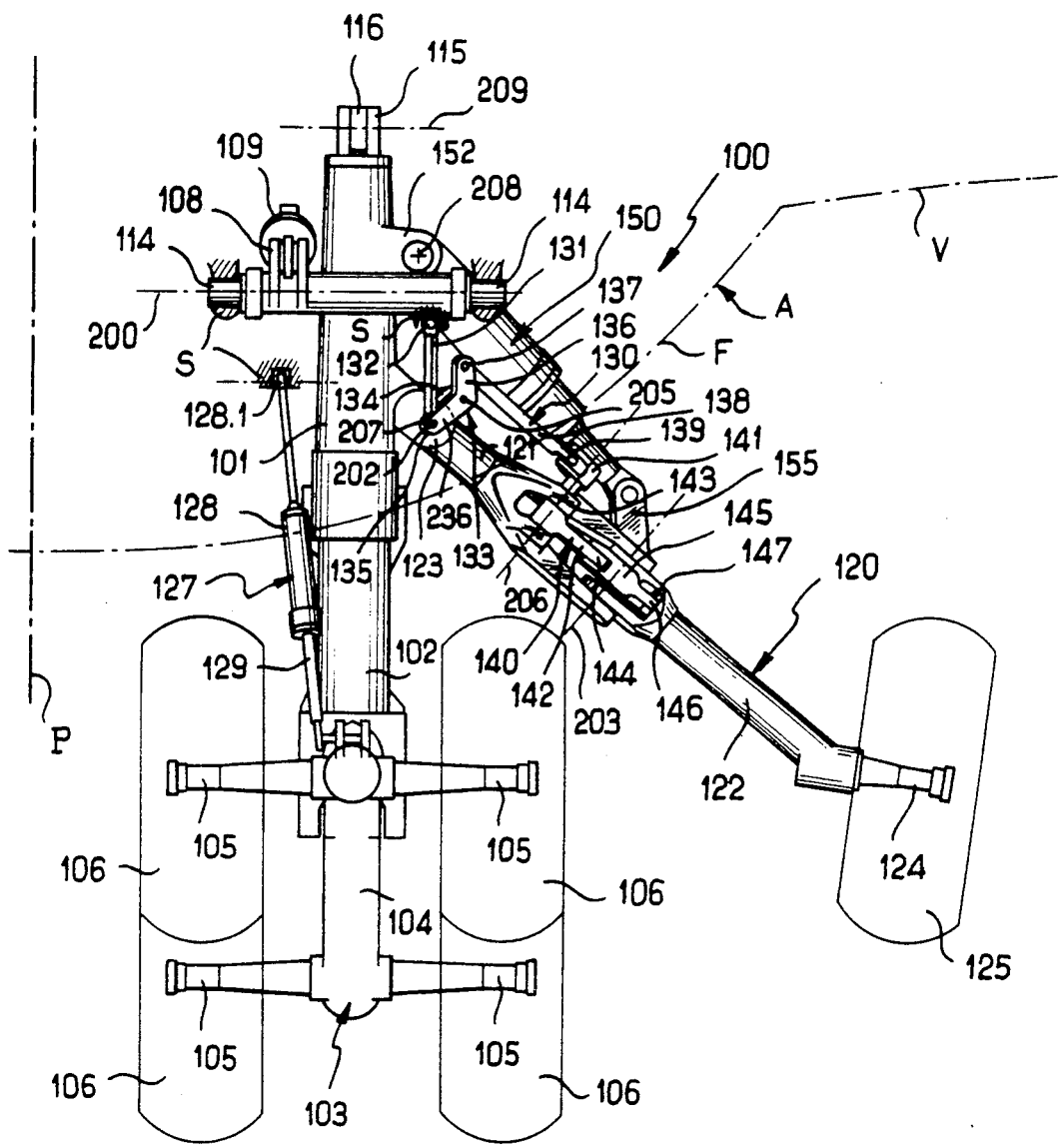
FIG. 2 is a front view of the above-mentioned landing gear the structure of the airplane being represented diagrammatically by a chain-dotted line in order to clarify the disposition of said landing gear beneath the fuselage of the airplane)

Firstly, there is a first link 131 which is hinged by a ball joint 132 to a fixed point on the airplane structure: this hinge connection with the structure S of the airplane is shown diagrammatically in FIG. 2. This first link 131 extends substantially parallel to the axis of the shock absorber strut 101, and its other end 135 is hinged to a first crank lever 133. The crank lever 133 is hinged to an appendix 134 of the upper arm 121 of the lateral stabilizer so as to pivot about an axis 205 which is essentially parallel to the hinge axis 202 between said upper arm and the strut 101. On one side of the axis 205, the crank lever 133 has a branch 236 whose end is hinged to the end 135 of the first link 131, and on the other side of the axis 205, the crank lever has a second branch 136 whose end is hinged to a second link 138 via the end 137 of said link. The link 138 lies along the upper arm 121 of the lateral stabilizer with lateral clearance being available at its hinge with the crank lever 133. The other end 139 of said second link 138 is hinged to a second crank lever 140 which is hinged on a second appendix 143 of the upper arm 121 to pivot about an axis 206 which is parallel to the hinge axis 203 between the two arms 121 and 122 of the lateral stabilizer. This second crank lever 140 has two branches which in this case are offset (although that is not essential), with a first branch 141 being hinged to the second link 138 and with a second branch 142 that passes between the two branches of the upper arm 121, and with the end 144 thereof being hinged to a third link 145 which is hinged to an appendix 147 of the lower arm 122 of the lateral stabilizer.

Naturally this type of linkage could be replaced by other hinged systems, providing the way in which the lateral stabilizer folds remains compatible with the desired degree of compactness.

However, the organization shown herein presents several advantages as specified below.

Firstly, the points of attachment to the airplane are minimized insofar as the hinged system is connected to the structure of the airplane at one point only, and in particular by means of the ball joint 132 associated with the first link 131. Furthermore, the first link 131 and the first crank lever 133 are hinged to each other about an axis 207 which is colinear with the hinge axis 202 between the upper arm 121 and the strut 101 when the lateral stabilizer 120 is in the deployed position, as shown in FIGS. 1 to 3. This ensures that the first link 131 is entirely neutral while the airplane is taxiing, in other words that said link does not induce any interfering movement while the airplane is taxiing, and has an effect only while the landing gear is being raised.

Also preferably, the third link 145 is hinged to rotate on the appendix 147 of the lower arm 122 so as to rotate freely about an axis 208 (more clearly seen in FIG. 3) which is likewise parallel to the hinge axis 202 between the upper arm 121 and the strut 101. The branch 142 of the second crank lever 140 and the third link 145 thus constitute an alignment side brace for the lateral stabilizer 120, which alignment is broken during raising of the landing gear by the other branch of said crank lever 140, by the action of the first link 131, of the first crank lever 133, and of the second link 138.

It is also advantageous further to provide a shock absorber 150 in association with the lateral stabilizer 120 for the purpose of co-operating with said stabilizer while the airplane is taxiing, thereby damping the vibrations to which said stabilizer is subjected.

Still for the purpose of minimizing attachment points with the airplane, it is advantageous to install the stabilizer shock absorber between the stabilizer and the strut of the landing gear shock absorber. Thus, as can be seen in FIGS. 1 to 3, the shock absorber 150 comprises a body 151 which is hinged about an axis 208 to the strut 101 via a lateral appendix 152 on said strut, and a rod 153 which is hinged at its end 154 to a projecting appendix 155 secured to one of the end branches of the upper arm 121 of the lateral stabilizer 120. To hinge the actuator body to the strut 101, the corresponding axis (208) is essentially parallel to the hinge axis 202 between the lateral stabilizer and the strut 101, while nevertheless allowing for a certain amount of lateral clearance; it may be advantageous for the end 154 of the rod 153 of the shock absorber 150 to be rotatably hinged to the appendix 155 of the upper arm 121 so as to enable it to rotate freely about an axis that coincides with the hinge axis 203 between the upper arm 121 and the lower arm 122 of the lateral stabilizer.

For the purpose of actuating the raisable landing gear, there can also be seen a drive actuator 109 whose rod 110 is hinged at its end 111 to a projecting appendix 108 of the extension 107 that is integral with the strut 101. The body 112 of the drive actuator 109 is hinged at its rear end 113 to the structure of the airplane, about an axis referenced 201. The upper portion of the strut 101 is also extended beyond its hinge axis 200 by means of an end appendix 115 which is connected to the structure of the airplane via a short hinged side brace constituted by two arms 116 and 117. The arm 116 is hinged to the strut 101 about an axis 209 which is parallel to the hinge axis 200 of the strut, and the arm 117 is preferably hinged about an axis that is colinear with the axis 201 associated with the body of the drive actuator 109. The two arms 116 and 117 of said hinged side brace are in alignment when the landing gear is in its lowered position (as can be seen in FIGS. 1 and 3), and also when the said landing gear is in its raised position (as can be seen in FIG. 4). Thus, when in alignment, this short side brace constitutes both bracing means for the landing gear in its lowered position, and locking means when it is in its raised position. Such a side brace thus represents a considerable advance over the long side braces generally provided for known wing landing gear, which side braces provide only poor efficiency. In particular, the side brace is very short and lightly loaded, and in addition, the locking it provides for the landing gear in the raised position makes it possible to omit the catch box that is normally provided, thereby further simplifying the structure and contributing to lightening the airplane. Preferably, this short side brace is disposed so as to remain in the midplane of the strut 101 perpendicular to the hinge axis 200 of said strut. This avoids setting up twisting forces in the shock absorber strut, thereby stressing it less. Furthermore, the above-mentioned side brace may be provided with locking means (not shown) such as an additional alignment of conventional type.

At the bottom of the landing gear 100, there can be seen an alignment scissors linkage associated with the sliding rod 102 and comprising a lower arm 118 and an upper arm 119, in conventional manner.

Although not constituting any kind of limitation on the ambit of the present invention,, the wheel set 103 of the raisable landing gear 100 is implemented in the present case in the form of a tilting-chassis bogie (or tilting-beam bogie) 104. A telescopic link 127 may then be associated with the tilting bogie so as to ensure that said bogie is put in a horizontal position when the landing gear is raised, as can be seen more clearly in FIGS. 4 and 5. This link 127 comprises a body 128 having a ball joint 128.1 at the end thereof for the purpose of being hinged to the airplane structure (the detail of the structure S being represented diagrammatically in FIG. 2). The link 127 includes a rod which is hinged to the tilting chassis 104 via associated appendices 126.

All the advantages of a tilting-bogie landing gear are thus retained together with the advantages inherent to having a landing gear that is short. As can be seen in FIG. 2, the ball joint 128.1 is hinged to the airplane fuselage when the landing gear is organized as shown in the figures.

The invention is not limited to the embodiment described above, but on the contrary extends to any variant that uses equivalent means to reproduce the essential characteristics specified above.

We claim:

1. Raisable landing gear comprising a shock absorber strut hinged to the structure of an airplane and provided with a shock absorber rod that is slidable in said strut and that has a wheel set provided at the end thereof, wherein the landing gear further includes a lateral stabilizer hinged to the strut, being capable of pivoting about a hinge axis that is essentially parallel to the longitudinal midplane of the airplane, and fitted with a wheel at its free end, and also mechanical coupling means associated with the lateral stabilizer in such a manner that firstly lowering the landing gear deploys the lateral stabilizer so that the wheel of said stabilizer when in the landing gear lowered position provides support additional to that provided by the wheel set and also constitutes a lateral stabilizer proper while the airplane is taxiing, and that secondly raising said landing gear folds the lateral stabilizer so as to enable the entire landing gear to be housed together in the landing gear raised position.

2. Landing gear according to claim 1, wherein the lateral stabilizer is formed by two arms that are hinged together, comprising an upper arm which is hinged on a lateral appendix of the strut, and a lower arm that is terminated by a wheel axle, and that the mechanical coupling means associated with said stabilizer include a hinged system organized in such a manner that raising the landing gear causes the lower arm to pivot through about 90° relative to the upper arm.

3. Landing gear according to claim 2, wherein the hinged system comprises, in succession: a first link hinged via a ball joint to a fixed point of the airplane structure, a first crank lever hinged on a first appendix of the upper arm to pivot about a first axis parallel to the hinge axis between said upper arm and said strut, a second link, a second crank lever hinged on a second appendix of the upper arm to pivot about a second axis which is parallel to a hinge axis between the upper and lower arms, and a third link hinged on an appendix of the lower arm, said second link, said second crank lever, and said third link constituting an alignment for the two arms of the lateral stabilizer.

4. Landing gear according to claim 3, wherein the first link and the first crank lever are hinged to each other about an axis which is colinear with the hinge axis between the upper arm and the strut when the lateral stabilizer is in its deployed position, thereby ensuring that said first link is neutral while the aircraft is taxiing.

5. Landing gear according to claim 3, wherein the third link is rotatably hinged on the appendix of the lower arm so as to rotate freely about a third axis also parallel to the hinge axis between the upper arm and the strut.

6. Landing gear according to claim 2, further including a shock absorber associated with the lateral stabilizer, the body of the shock absorber being hinged to the strut, and the rod of the shock absorber being hinged to the upper arm of said stabilizer.

7. Landing gear according to claim 3, further including a shock absorber associated with the lateral stabilizer, the body of the shock absorber being hinged to the strut, and the rod of the shock absorber being hinged to the upper arm of said stabilizer and wherein the rod of the shock absorber is rotatably hinged on a third appendix of the upper arm to rotate freely about an axis that coincides with the hinge axis between the upper arm and the lower arm.

8. Landing gear according to claim 1, wherein the upper portion of the strut is extended beyond its hinge axis by an end appendix which is connected to the structure of the airplane via a short hinged side brace which side brace, when in alignment, constitutes means for bracing the landing gear in its lowered position and means for locking the landing gear in its raised position.

9. Landing gear according to claim 8, wherein the short side brace is disposed to remain in a midplane of the strut that is perpendicular to the hinge axis of said strut.

10. Landing gear according to claim 1, in which the wheel set is implemented in the form of a tilting chassis bogie, and wherein a telescopic link is associated with the tilting bogie in such a manner as to ensure that said bogie is put into a horizontal position in the landing gear raised position, the body of said link being hinged via a ball joint to the structure of the airplane, and the rod of said link being hinged to the tilting chassis of said bogie.

* * * * *